United States Patent [19]
Graves

[11] Patent Number: 5,188,904
[45] Date of Patent: Feb. 23, 1993

[54] SOLUTION-APPLIED LAMINATE RELEASE FOR TAM BLADDERS

[75] Inventor: Daniel F. Graves, Clinton, Ohio

[73] Assignee: Bridgestone Corporation, Tokyo, Japan

[21] Appl. No.: 663,514

[22] Filed: Mar. 4, 1991

[51] Int. Cl.⁵ .................... B32B 9/04; B05D 3/02
[52] U.S. Cl. .................. 428/447; 428/448; 427/387; 427/393.5
[58] Field of Search ............ 428/448, 447; 427/387; 528/901

[56] References Cited

U.S. PATENT DOCUMENTS

| | | | |
|---|---|---|---|
| 2,938,010 | 5/1960 | Bluestein | 528/21 |
| 4,410,677 | 10/1983 | Lampe | 528/17 |
| 4,434,832 | 3/1984 | Koch | 152/370 |
| 4,485,135 | 11/1984 | Koch | 428/36 |
| 4,485,136 | 11/1984 | Koch | 428/36 |
| 4,533,305 | 8/1985 | Comper et al. | 425/43 |
| 4,534,812 | 8/1985 | Fukui et al. | 156/132 |
| 4,544,427 | 10/1985 | Hausch | 156/97 |
| 4,547,544 | 10/1985 | Allardice | 524/267 |
| 4,588,770 | 5/1986 | Würminghausen et al. | 524/731 |
| 4,618,519 | 10/1986 | Koch et al. | 428/63 |
| 4,696,332 | 9/1987 | Koch | 152/367 |
| 4,718,469 | 1/1988 | Koch et al. | 152/370 |
| 4,732,196 | 7/1988 | Koch et al. | 152/367 |
| 4,759,959 | 7/1988 | Guy | 427/282 |
| 4,765,852 | 8/1988 | Koch et al. | 156/97 |
| 4,772,676 | 9/1988 | Koch et al. | 528/49 |
| 4,798,640 | 1/1989 | Koch et al. | 156/95 |
| 4,853,069 | 8/1989 | Williams et al. | 156/401 |
| 4,877,469 | 10/1989 | Szyms et al. | 156/123 |
| 4,923,543 | 5/1990 | Koch et al. | 156/97 |

FOREIGN PATENT DOCUMENTS

| | | |
|---|---|---|
| 1178265 | 11/1984 | Canada . |
| 0399526 | 3/1989 | European Pat. Off. . |
| 0385919 | 5/1990 | European Pat. Off. . |

*Primary Examiner*—Jenna L. Davis
*Assistant Examiner*—Chris Raimund
*Attorney, Agent, or Firm*—Daniel N. Hall

[57] ABSTRACT

Disclosed is a solution-applied laminate release system useful in improving release properties toward uncured rubber to rubber bladders and, particularly, tire assembly machine (TAM) bladders having at least a portion of their outer surface covered with the releasing system comprised of (a) a primer system comprising (i) at least one layer of a halogenating treating agent and (ii) at least one layer of a silane coupling agent overlaid by (b) a layer of at least one layer of silicone release coating bonded to the silane coupling agent layer.

22 Claims, No Drawings

SOLUTION-APPLIED LAMINATE RELEASE FOR TAM BLADDERS

FIELD OF THE INVENTION

This invention relates to a solution-applied laminate release system for coating elastomeric bladders. More specifically, the release system is releasing toward uncured rubber and is formed by applying a treating agent to the buffed rubber substrate of the bladder outer surface, then a silane coupling agent, and finally at least one silicone layer-forming solution. The laminated release system is effective on bladders used in tire assembly machines (TAMs) to release uncured tire carcasses.

BACKGROUND

Conventionally, it is known in the art to build rubber tire carcasses or bodies through the use of machines (TAMs) having as components rubber bladders. The TAM bladders contact the carcasses being built in the TAM, often under increased pressure. During this process, the bladder has a tendency to adhere to the uncured tire carcass which hinders production and may damage both the bladder and the tire carcass.

U.S. Pat. No. 4,533,305, issued to Comper et al., relates to a rubber tire curing bladder having a coating containing a polydimethylsiloxane, a silane, a surfactant and optionally a metal salt of an organic acid.

U.S. Pat. No. 4,534,812, issued to Fukui et al., relates to a method for forming tires by use of a tire-forming machine having a drum bladder and a turnup bladder.

U.S. Pat. No. 4,547,544 issued to Allardice, relates to a method and composition for the release of air bladders from tire carcasses during tire construction. The method involves the application of a bladder release composition directly upon the expandable air bladder in the TAM. The bladder release composition typically consists of a blend of siloxanes.

U.S. Pat. No. 4,853,069, issued to Williams et al., discloses elastomer structures having exposed controlled surface release characteristics made by coating at least a portion of their surface with a release composition comprising (a) a chlorosulphonated polymer; (b) a reinforcing filler, and (c) a green tackifying agent. Optionally, these compositions can also contain a chemical curing system and one or more volatile solvent/diluent viscosity-reducing vehicle. Among the elastomeric structures disclosed are TAM bladders.

U.S. Pat. No. 4,877,469, issued Szyms et al., discloses a thin, membrane-like cylindrical rubber tire curing bladder with reinforcing cords wound in parallel spiral paths at any composite angle to the longitudinal axis of the cylinder.

A number of U.S. Patents disclose treating agents for rubber surfaces including the various N-halohydantoins, the various N-haloamides, the various N-haloimides, and combinations thereof. Preferred treating compositions disclosed include the various mono-, di- or trichloroisocyanuric acid. Among the patents disclosing these treating agents are:

U.S. Pat. No. 4,434,832, to Koch et al.;
U.S. Pat. No. 4,485,135, to Koch;
U.S. Pat. No. 4,485,136, to Koch et al.;
U.S. Pat. No. 4,544,427, to Hausch;
U.S. Pat. No. 4,618,519, to Koch et al.;
U.S. Pat. No. 4,696,332, to Koch;
U.S. Pat. No. 4,718,469, to Koch et al.;
U.S. Pat. No. 4,732,196, to Koch et al
U.S. Pat. No. 4,765,852, to Koch et al.;
U.S. Pat. No. 4,772,676, to Kooh et al.;
U.S. Pat. No. 4,798,640, to Koch et al.;
U.S. Pat. No. 4,923,543, to Koch et al.

European Pat. Application (EPA) Publication No. 0385,919 to Oliver discloses a method of treating a rubber expandable tire cure bladder by forming a base release coat thereon followed by the application of a lubricant top coat. The base release coat is derived by applying a composite of an hydroxyl terminated polyorganosiloxane and an aminoorganosilane to an expandable bladder and thereafter applying a lubricant topcoat derived from selected polyorganosiloxane components.

EPA Publication No. 0399,526 discloses a bladder lubricant for tire molding comprising an organo polysiloxane resin; an organosilane; a condensation catalyst; and optionally a diorganopolysiloxane with terminal hydroxy or alkoxyl groups. This lubricant is useful in releasing curing bladders from cured rubber tires.

SUMMARY OF THE INVENTION

It is an object of the present invention to improve the releasing properties of the outer surface of elastomeric bladders by providing a release laminate system comprising a primer system and a release coating for the bladders. It is especially applicable to tire-building bladders to allow rapid and repeated release of uncured tire bodies from the building bladders during the tires' formation and construction. Other objects of this invention are to provide a faster curing release system and to prevent unwanted tire rubber-to-bladder rubber adhesion.

Still another object of the present invention is to provide a primer system for effectively bonding a silicone release layer to a flexible elastomeric substrate layer, especially where both the substrate and the object to be released are made of similar material.

The primer system (a) comprises (i) a treating agent which is applied to the building bladder substrate and forms a layer to which is applied (ii) an organic silane layer. The silicone release coating (b) is then applied over the typically two-layer primer system. The release coating is generally a room temperature vulcanizable (RTV) silicone such as an acyloxy terminated polysiloxane in combination with an oxime terminated polysiloxane. Thus, a laminated, multilayer release system is made which system comprises a laminate of (a) a primer system adhered to the tire building bladder, said primer system comprising at least one layer of a treating agent residing on said building bladder, and at least one layer of an organic silane residing on said treating agent layer, and (b) an organic silicone release coating residing on said organic silane layer, said organic silicone release coating comprising a mixture of an acyloxy terminated polysiloxane and an oxime terminated polysiloxane, and an optional catalyst. The release coating can be cured in the presence of an optional catalyst. The laminated release systems of the present invention are durable and flexible and performed over thousands of tire building cycles requiring thousands of bladder contacts and release cycles with an uncured tire carcass.

DETAILED DESCRIPTION OF THE INVENTION

The release laminate system of the present invention, generally comprises (a) a multicomponent primer system, and (b) a silicone release coating which is room temperature vulcanizable, i.e. an RTV silicone.

Tire assembly machines (TAMS) contain elastomeric structures such as inflatable rubber bladders which are conventionally used for such manufacturing operations as turning up ply ends over bead rings and against plies on the TAM mandrel or drum. These rolling, inflatable turn-up bladders (TUBS) turn the ends of the plies wrapped on the tire-building mandrel up around the bead rings and over them against the ply material. The uncured rubber ply material is tacky by nature, and it is this tack which causes the plies to stick together and thus maintain the integrity of the partially built or green tire. The TUBS are conventionally made from vulcanized rubber, natural, synthetic or mixtures of the two with optional fabric reinforcement, and the tacky ply ends have a tendency to stick to the outer surfaces of the bladder which turns them up, particularly since the inflated bladders exert pressure on the turned-up ply ends. This adhesion tends to retard the retraction of the deflated bladders, and it can also result in erosion of the bladder material coming in contact with the ply ends. Eventually this erosion will lead to malfunction of the bladder operation and require expensive bladder replacement. Therefore, bladders with good releasing surfaces are desirable because of their long service life. Thus, it is desirable to provide TUBS with surfaces which are non-adhesive or releasing to the uncured tire plies with which they may come in contact.

The substrate of the present invention is a building bladder and, more particularly, the outer surfaces of the bladder which normally come into contact with the uncured tire carcasses during carcass manufacture in a TAM. These substrate surfaces are comprised of elastomers generally known to those skilled in the art and to the literature. Typical elastomers include those made from conjugated dienes, such dienes generally having 4 to 8, and preferably from 4 to 6, carbon atoms, with specific examples including butadiene, isoprene, and the like. Both natural rubber and synthetic rubber are contained within this group. Another class of elastomeric substrates are various copolymers made from a conjugated diene monomer such as those set forth immediately hereinabove and a vinyl substituted aromatic having from 8 to 12, and desirably from 8 to 10 carbon atoms, such as styrene, alpha-methyl styrene, and the like, with styrene being preferred. An example of such a specific copolymer is SBR, i.e., styrene-butadiene rubber. A highly preferred substrate elastomer is natural rubber.

Still another building bladder substrate are the various polyurethanes which are reinforced with nylon cords. Such substrates are commercially available as Spandex, such as Lycra, manufactured by Du Pont.

The cured building bladders are generally prepared for the application of the various layers of the primer system, as by buffing with a grit paper, emery cloth, etc. Any size grit paper known to the art and to the literature may be used, with from about 30 to about 200 grit being suitable, and with about 50 grit paper being preferred. Once the substrate is buffed, it is then cleaned by washing with a solvent solution. The solvent solution used subsequent to buffing, can be any solvent known to the art and the literature, with various organic solvents being suitable, such as toluene, 1,1,1-trichloroethane, and the like, with ketones such as acetone, methyl ethyl ketone, and cyclohexanone being preferred.

The primer system (a) of the present invention generally comprises at least two types of components, namely (i) a treating agent layer to which is subsequently applied (ii) one or more organic silane coupling layers. Suitable treating agents (i) to form the first layer include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acid. A preferred treating composition for use in the practice of the present invention are the various mono-, di- or trichloroisocyanuric acids, or combinations thereof. Trichloroisocyanuric acid is especially preferred.

The treating agents (i) usually exist in solid form. They are readily soluble in solvents such as alkyl ethers, lower alkyl ketones (e.g., acetone) or alkanoic alkyl esters (e.g., methyl acetate) and the like and thus can be applied in liquid form. Application of the treating agent is generally carried out at ambient temperatures. Application can occur through any conventional manner as through brushing, rubbing, spraying, and the like. The amount applied is such that a substantial portion of the rubber substrate surface is coated. Preferably two or more coats of the treating agent or adhesive compound are used to ensure that all the cured rubber substrate surface has been coated. The treating agent is generally very thin and often essentially a monomolecular layer in thickness. The purpose of the treating agent is to activate the surface of the rubber substrate to improve adhesion between the organic silane coupling layer and the rubber substrate. A typical commercially available primer treating agent is Chemlok 7701 ® sold by the Lord Corporation of Erie, PA, USA, which is an ethyl acetate solution of trichloro isocyanuric acid.

A typical amount of the treating agent (i) in the suitable solvent, for example ethyl acetate, acetone, or tetrahydrofuran, is generally from about 0.1 to about 10 percent by weight based upon the total weight of said treating agent and solvent, and preferably from about 0.5 percent to about 5 percent. Of course, higher or lower concentrations can be utilized. It is thought that the treating agent adds halogen groups, for example, chlorine, to the cured rubber surface. In any event, it activates the rubber substrate surface to bond effectively with the second component of the primer, the silane.

The organic silane coupling agent, component (ii) of the primer, is generally applied in a solution and typically is an organo alkoxy silane. Such silane coupling agents are known to the art and to the literature.

The organo alkoxy silane coupling agents (ii), the second type of primer component, are generally di- or tri-alkoxy silanes having in addition one or two organo-substituents where the substituent is bonded to the rest of the molecule through two carbon-silicon bonds. Such organo alkoxy silanes can be represented by the formula

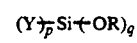

wherein each R is independently lower alkyl (methyl, ethyl, propyl, etc.) or alkylene alkoxy of 3 to about 9 carbon atoms, e.g. ($-CH_2CH_2OCH_3$), ($-CH_2CH_2O-CH_2CH_2OC_2H_5$), and the like; p is 1 or 2; q is 2 or 3, the sum p+q is 4; and Y is an organo substituent bonded to the Si atom through a carbon-silicon bond such as:

(1) vinyl (e.g., $CH_2=CH-$);
(2) amino alkylenyl ($H_2NR'-$);
(3) di- or tri-amino alkylenyl ($H_2NR'NHR'-$);
(4) mercapto alkylenyl ($HS-R'-$)
(5) Ω-acryl or methacryl alkylenyl ($CH_2=CHC(O)OR'-$) wherein R' is an alkylenyl group of 2 to about 6 carbon atoms such as ethylene ($-CH_2CH_2-$), propylene ($-CH_2CH-CH_3-$), trimethylene ($-CH_2CH_2CH_2-$), isobutylenyl ($-CH_2CHCH_3-$), etc. Preferred silane coupling agents are trialkoxy silanes, especially vinyl and amino alkylenyl trimethoxy silanes. Examples of useful specific alkoxy silane coupling agents include aminopropyltrimethoxy, aminopropyltriethoxy, vinyltriethoxy, and vinyltrimethoxy silane, and the like, with aminopropyltrimethoxy silane being preferred. A commercially available, suitable silane coupling agent is Chemlok 607®, manufactured by The Lord Chemical Company of Erie, PA, USA, which is generally a mixture of amino and vinyl methoxy silanes in a methanol solution. The silane primers are generally applied in a solution utilizing conventional organic solvents such as various alcohols, for example methanol, ketones, for example acetone, ethers, esters, and hydrocarbons such as hexane and mixtures of these. In some instances, water-alcohol mixtures can be also used. The amount of silane is generally from about 1 percent to about 100 percent by weight based upon the total solution weight of the solvent and the silane.

The primer system, that is, the combination of (i) the various treating agent activation layers which often is only one or two layers, and (ii) the organic silane coupling layer which generally is only one layer, can be applied by any method known to the art and to the literature, such as by dipping, painting, brushing, rubbing, spraying, and the like. The organic silane layer is very thin, and often has a thickness of from about 1 to about 100 mils. Each primer layer is permitted to dry and the time required for the same is from about 1 or 2 to about 50 minutes, and generally from about 30 to about 45 minutes.

Once the bladder is primed by the application of both (i) and (ii) layers, the silicone release coating layer (b) is applied. The release coating system is actually a mixture of generally two types of polysiloxanes, specifically an acyloxy terminated polysiloxane and an oxime terminated polysiloxane. This mixture of silicone types impart both high strength and good bonding to the silane coating. The acyloxy terminated polysiloxane can generally be any such compound known to the art and to the literature. Such compounds can generally be represented by the formula:

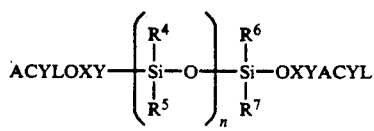

wherein the non-carbonyl portion of each acyl group, independently, is generally an alkyl group having from 1 to 6 carbon atoms, and preferably is methyl, wherein each $R^4$, $R^5$, $R^6$, and $R^7$ are independently, an aliphatic group having a total of from 1 to 8 carbon atoms, such as a vinyl group, or desirably an alkyl group, with methyl being preferred, or independently an aromatic group having from 6 to 12 carbon atoms. Generally, n is a number such that the number average molecular weight of the acyloxy terminated polysiloxanes is from about 20,000 to about 200,000. Generally, these silicones are liquid or readily soluble solids and room temperature curable. A specific preferred acyloxy terminated polysiloxane containing silica filler is a polydimethyl siloxane which is commercially available from the Loctite Corporation under the tradename of Permatex Blue. The amount by weight of the acyloxy terminated polysiloxane present in the silicone release coating layer is from about 25 to about 95 percent by weight, desirably from about 50 to about 90 percent by weight, and preferably from about 65 to about 85 percent by weight, based upon the combined weight (solids) of the acyloxy terminated polysiloxane and the oxime terminated polysiloxane.

Another component of the silicone release coating system is the above-noted oxime terminated polysiloxane. Such oxime terminated polysiloxanes are generally known to those in the art as well as to the literature and often can be represented by the formula:

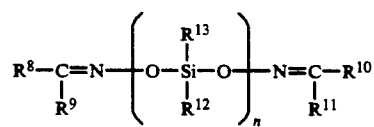

wherein each $R^8$, $R^9$, $R^{10}$, and $R^{11}$, independently, is an alkyl group having from 1 to 10 carbon atoms, and preferably methyl or ethyl, wherein each $R^{12}$ and $R^{13}$, independently, is an alkyl group having from about 1 to about 8 carbon atoms, or an aryl group having from about 6 to 10 carbon atoms, and wherein n is a number such that the number average molecular weight of the polysiloxane is from about 20,000 to about 200,000. An example of a commercially available oxime terminated polysiloxane which is preferred is Dow 92-009, a methylethyloxime terminated dimethylsiloxane.

The amount of the oxime terminated polysiloxane utilized in the RTV silicone release coating system is from about 5 percent to about 75 percent by weight, desirably from about 10 percent to about 50 percent by weight, and preferably from about 15 percent to about 35 percent by weight based upon a combined solids weight of the oxime terminated polysiloxane and the acyloxy terminated polysiloxane.

The silicone release system is generally applied to the primed bladder substrate in the form of a solution wherein the various polysiloxanes (i.e. from about 30 to about 60 percent by weight) are dissolved in a suitable amount of a solvent. Such solvents are generally known to the art and to the literature and are generally hydrocarbon solvents or halogenated hydrocarbon solvents, with specific examples including the various alkanes, such as hexane, heptane, and the like; various aromatic solvents, such as toluene, and the like; or various halogenated alkanes, such as 1,1,1-trichloroethane, and the like. The silicone release coating system can be applied to the primed bladder and allowed to cure at room temperature or in the presence of heat. The use of heat is generally desirable inasmuch as it accelerates the curing reaction whereby the silicone release coating mixture is generally thought to be become chemically bonded to the organic silane primer layer and achieves good adhesion therewith. Curing temperatures range from approximately room temperature up to about 212° F. (100° C.), with from about 140° (60° C.) to about 160° F. (71° C.) being preferred. The application of the silicone release system to the primed rubber substrate can be in any conventional manner, as by brushing, spraying, dipping, rubbing, and the like. The amount of the release coating applied is such that upon drying the thickness of the silicone release layer is generally from about 3 to about 20 mils, and preferably from about 5 to about 15 mils.

The use of a catalyst with the silicone release system mixture is optional, but is generally desirable inasmuch as a coating system with better release properties such as durability and flexibility results. Generally, any suitable catalyst system can be utilized in association with the various polysiloxane compounds. A desirable type of catalyst are the various organo tin catalysts which are known to the art and to the literature, and include those set forth in U.S. Pat. Nos. 4,356,116, and 4,395,526, which are hereby fully incorporated by reference. Examples of such specific tin catalysts include dibutyltindiacetate, tin octoate, dimethyltin dibutyrate, triethyl tin tartrate, tin oleate, dibutyltinoxide, dimethyl tin bis neodeconate, and preferably dibutyl tin dilaurate. The amount of the catalyst is generally from about 0 to about 0.5 percent by weight, and preferably from about 0.1 to about 0.3 percent by weight based upon the combined weight (solid) of the acyloxy terminated polysiloxanes and the oxime terminated polysiloxanes present in the silicone release coating.

Various conventional additives, fillers, and the like, can also be utilized in association with the silicone release coating and the same are known to the art and to the literature. For example, various treated or modified silicas can be utilized for improved strength and as a wetting agent, such as hexamethyldisilazane. Other fillers including carbon black, various clays, and the like can also be used.

The invention will be better understood by the following examples which both illustrate the use of the invention, and compare it with other less advantageous release systems.

EXAMPLE 1

A natural rubber tire building bladder was buffed on its outer surface that contacts the tire carcass with 50 grit paper. The buffed surface was washed with acetone. A 3 percent by weight solution of trichloro isocyanuric acid (that is, N-chloro substituted s-triazinetrione) in ethyl acetate was brushed on the rubber, and allowed to dry for 30 minutes. Next, the alkoxy silane coupling agent, a 20 percent Chemlok 607 methanol solution, was applied using a brush, and was allowed to dry for 40 minutes.

The silicone release coating mixture was prepared by mixing 50 parts by weight of Permatex Blue RTV ®, and 50 parts by weight of Dow 92-009 ® dispersion silicone (33 percent solids by weight polysiloxanes which were dissolved in hexane (44 percent by weight solid). A small amount, 0.20 percent by weight, of dibutyltindilaurate curing catalyst, was added to the polysiloxane mixture. The resulting silicone release mixture solution was painted on the primed rubber and allowed to dry and cure for 24 hours at room temperature, approximately 75° F., to prepare a bladder with the releasing system of the present invention.

LABORATORY EVALUATION TESTS

Tests were carried out in the laboratory using slabs of the same type of rubber used to make the outer portion of a TAM bladder. Solutions of various polysiloxane release agents were applied to approximately 50 percent of the surface of a 6×6×0.100 inch cured slab of natural rubber bladder compound. Using these coated slabs, peel adhesion test specimens were built as follows: A black tire sidewall uncured stock was laminated against the coated cured slab of bladder compound using a nylon screen between the two materials to give the uncured sidewall stock rigidity and to produce a test plaque. Holland cloth was used as a spacer on the surface of the sidewall stock and the test plaque was pressed in a 6×6 inch positive pressure mold for 5 minutes at 200° F. using 2,000 lbs. of pressure. One inch strips were then cut for use in 180 degree peel adhesion tests.

The strips were then pulled apart at a rate of 10 inches per minute at room temperature using an Instron machine. The peel force as well as percent coverage of the uncured stock adhering to the cured bladder material was recorded and the results summarized in Table I.

COMPARATIVE EXAMPLE 2

Demonstrating Primer Failure

A cured natural rubber slab of the same type of rubber used to make building bladders was buffed as in Example 1. Dow S-2260 ® primer (a commercially available organic primer not containing the treating agents of the present invention) was painted on the slab, and allowed to dry for 30 minutes. Dow 92-009 ®, an air drying liquid dispersion silicone, was applied to the primed surface. The resulting silicone release mixture treated slab was allowed to cure for 48 hours. The results of testing of this material are set forth in Table I. This comparative example demonstrates the importance of using the treating agent (a)(i) of the present invention.

COMPARATIVE EXAMPLE 3

Demonstrating Importance of the Silicone Combination

A silicone release coating was prepared by using Dow 92-009 ® dispersion silicone alone, with Chemlok 7701 and Chemlok 607 primers. The resulting silicone release mixture solution was painted on the primed rubber and allowed to cure for 24 hours. The results of the testing is shown in Table I. This comparative example demonstrates the importance of the combination silicones of the present invention.

COMPARATIVE EXAMPLE 4

Demonstrating Primer Failure

Dow 92-009 ® dispersion silicone was used with a known control primer system (recommended for use with Dow 92-009 ®) not of the present invention. The resulting silicone release mixture solution was painted on the rubber substrate and allowed to cure for 24 hours. The results of physical testing are shown in Table I.

Table I shows slab adhesion tests where the force required to peel a layer of uncured rubber (representative of the green tire carcass) from a slab of cured rubber stock (representative of the bladder) was measured. The slab was either untreated or treated in accordance with the invention.

TABLE I

| | Adhesion (lbs. force) | Type of Failure | Peel Force | |
|---|---|---|---|---|
| | | | Untreated | Treated |
| Ex. 1 | 5.5 | Cohesive | 9.0 | 0 |
| Ex. 2 | 2.0 | Adhesive | 9.5 | 0 |
| Ex. 3 | 4.75 | Adhesive | — | — |
| Ex. 4 | 3.5 | Adhesive | — | — |

An in-machine test was conducted with a bladder treated in accordance with this invention. It was found that the bladder preformed successfully for more than 35,000 machine cycles. In contrast, bladders not so treated did not preform satisfactorily after 20,000 cycles. In another similar test, the treated bladder performed for more than 11,000 cycles while one not so treated did not preform satisfactorily after 10,000 cycles.

While in accordance with the Pat. Statutes, the best mode and preferred embodiment has been set forth, the scope of the invention is not limited thereto, but rather by the scope of the attached claims.

What is claimed is:

1. A cured bladder for tire assembly machines (TAMs) having a solution-applied release laminate adhered thereto said laminate comprising:
   (a) a primer system adhered to the bladder, said primer system comprising 1) at least one layer of a treating agent selected from the group consisting of N-halohydantoin, N-haloamide, N-haloimide or combinations thereof residing on said bladder, and 2) at least one layer of an organic silane residing on an adhering to said treating agent layer, and
   (b) an organic silicone release coating residing on and bonded to said organic silane layer, said organic silicone release coating comprising a mixture of an acyloxy terminated polysiloxane and an oxime terminated polysiloxane, and an optional catalyst.

2. The bladder as in claim 1, wherein said organic silane is represented by the formula:

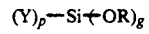

wherein each R is independently lower alkyl or alkylene alkoxy of about 3 to about 9 carbon atoms, wherein p is 1 or 2, q is 2 to 3, the sum of p+q=4, and wherein Y is an organo substituent bonded to the Si atom through a carbon atom.

3. The bladder as in claim 2, wherein said acyloxy terminated polysiloxane is represented by the formula:

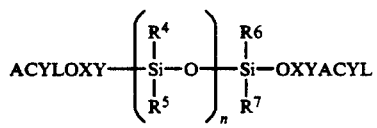

wherein the non-carbonyl portion of each acyl group, independently, is generally an alkyl group having from 1 to 6 carbon atoms, wherein each $R^4$, $R^5$, $R^6$, and $R^7$, independently, is an aliphatic group having a total of from 1 to 8 carbon atoms, or an aromatic group having from 6 to 12 carbon atoms, and n is a number such that the number average molecular weight of the acyloxy terminated polysiloxane is from about 20,000 to about 200,000; and wherein said oxime terminated polysiloxane is represented by or the formula:

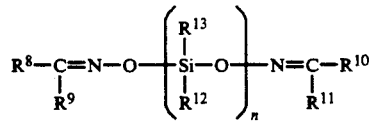

wherein each $R^8$, $R^9$, $R^{10}$, and $R^{11}$, independently, is an alkyl group having from 1 to 10 carbon atoms, wherein each $R^{12}$ and $R^{13}$, independently, is an alkyl group with from about 1 to about 8 carbon atoms, or an aryl group having from about 6 to 10 carbon atoms, and wherein n is a number such that the number average molecular weight is from about 20,000 to about 200,000.

4. The bladder as in claim 3, wherein said treating agent is mono-, di-, or trichloroisocyanuric acid, or combinations thereof.

5. The bladder as in claim 1, wherein said organic silane is an amino silane.

6. The bladder as in claim 5, wherein said acyloxy terminated polysiloxane is methyloxy polydimethylsiloxane, wherein said oxime terminated polysiloxane is a methylethyloxime terminated dimethylsiloxane, and wherein said treating agent is mono-, di-, or trichloroisocyanuric acid or combinations thereof.

7. The bladder as in claim 1, wherein said acyloxy terminated polysiloxane is present in an amount of from about 50 to about 90 percent by weight based upon the combined weight (solids) of the acyloxy terminated polysiloxane and the oxime terminated polysiloxane, and wherein the oxime terminated polysiloxane is present in an amount of from about 10 to about 50 percent by weight based upon the combined weight (solids) of the acyloxy terminated polysiloxane and the oxime terminated polysiloxane.

8. The bladder as in claim 7, including a curing catalyst in said siloxane combination, said catalyst being an organotin compound which is present in an amount of from about 0.1 to about 0.5 weight percent based upon the combined weight of said siloxanes.

9. The bladder as in claim 3, wherein said acyloxy terminated polysiloxane is present in an amount of from about 65 to about 85 percent by weight based upon the combined weight (solids) of the acyloxy terminated polysiloxane and the oxime terminated polysiloxane, and wherein the oxime terminated polysiloxane is present in an amount of from about 15 to about 35 percent by weight based upon the combined weight (solids) of the acyloxy terminated polysiloxane and the oxime terminated polysiloxane, and including said catalyst, and wherein said catalyst is dibutyltin dilaurate.

10. A process for coating a cured tire bladder, comprising the steps of:
    applying a treating agent selected from the group consisting of N-halohydantoin, N-haloamide, N-haloimide or combinations thereof to the tire bladder substrate, applying and adhering an organic silane layer to said treated substrate, and subsequently applying and bonding an organic silicone release coating to said organic silane layer, said release coating comprising an acyloxy terminated polysiloxane and an oxime terminated polysiloxane.

11. The process as in claim 11, wherein said organic silane is represented by the formula:

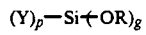

wherein each R is independently lower alkyl or alkylene alkoxy of about 3 to about 9 carbon atoms, wherein p is 1 or 2, q is 2 or 3, the sum of p+q=4, and wherein Y is an organo substituent bonded to the Si atom through a carbon atom.

12. The process as in claim 11, wherein said acyloxy terminated polysiloxane is represented by the formula:

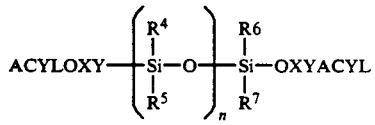

wherein the non-carbonyl portion of each acyl group, independently, is generally an alkyl group having from 1 to 6 carbon atoms, wherein each $R^4$, $R^5$, $R^6$, and $R^7$, independently, is an aliphatic group having a total of from 1 to 8 carbon atoms, or an aromatic group having from 6 to 12 carbon atoms, and n is a number such that the number average molecular weight of the acyloxy terminated polysiloxane is from about 20,000 to about 200,000; and wherein said oxime terminated polysiloxane is represented by or the formula:

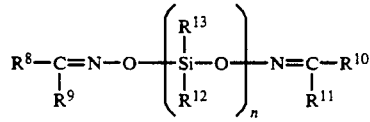

wherein each $R^8$, $R^9$, $R^{10}$, and $R^{11}$, independently, is an alkyl group having from 1 to 10 carbon atoms, wherein each $R^{12}$ and $R^{13}$, independently, is an alkyl group with from about 1 to about 8 carbon atoms, or an aryl group having from about 6 to 10 carbon atoms, and wherein n is a number such that the number average molecular weight is from about 20,000 to about 200,000.

13. The process as in claim 12, wherein said treating agent is mono-, di-, or trichloroisocyanuric acid, or combinations thereof.

14. A release coating laminate, comprising: a treating agent layer wherein the treating agent is selected from N-halohydantoin, N-haloamide, N-haloimide or combinations thereof;
an organic silane layer adhered to said treating agent layer; and
a cured silicone release layer bonded to said organic silane layer, said silicone release layer being made from a mixture comprising an acyloxy terminated polysiloxane, an oxime terminated polysiloxane, and an optional catalyst.

15. The laminate as in claim 14, wherein said acyloxy terminated polysiloxane is represented by the formula:

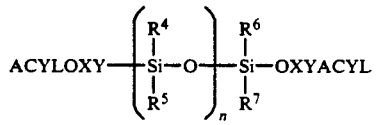

wherein the non-carbonyl portion of each acyl group, independently, is generally an alkyl group having from 1 to 6 carbon atoms, wherein each $R^4$, $R^5$, $R^6$, and $R^7$, independently, is an aliphatic group having a total of from 1 to 8 carbon atoms, as an aromatic having from 6 to 12 carbon atoms, wherein n is a number such that the number average molecular weight of the acyloxy terminated polysiloxane is from about 20,000 to about 200,000; and wherein said oxime terminated polysiloxane is represented by the formula:

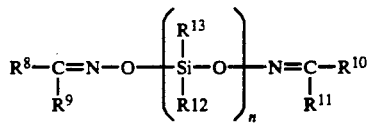

wherein each $R^8$, $R^9$, $R^{10}$, and $R^{11}$, independently, is an alkyl group having from 1 to 10 carbon atoms, wherein each $R^{12}$ and $R^{13}$, independently, is an alkyl group with from about 1 to about 8 carbon atoms, or an aryl group having from about 6 to 10 carbon atoms, and wherein n is a number such that the number average molecular weight is from about 20,000 to about 200,000.

16. The laminate as in claim 15, wherein said organic silane is represented by the formula:

wherein each R is independently lower alkyl or alkylene alkoxy of about 3 to about 9 carbon atoms, wherein p is 1 or 2, q is 2 or 3, the sum of p+q=4, and wherein Y is an organo substituent bonded to the Si atom through a carbon atom.

17. The laminate as in claim 16, wherein said treating agent is mono-, di-, or trichloroisocyanuric acid, or combinations thereof.

18. The laminate as in claim 17, wherein said organic silane is an amino silane.

19. The laminate as in claim 18, wherein said acyloxy terminated polysiloxane is methyloxy polydimethylsiloxane, wherein said oxime terminated polysiloxane is methylethyloxime terminated dimethylsiloxane, and wherein said treating agent is mono-, di-, or trichloroisocyanuric acid or combinations thereof.

20. The laminate as in claim 19, wherein said acyloxy terminated polysiloxane is present in an amount of from about 50 to about 90 percent by weight based upon the combined weight (solids) of the acyloxy terminated polysiloxane and the oxime terminated polysiloxane, and wherein the oxime terminated polysiloxane is present in an amount of from about 10 to about 50 percent by weight based upon the combined weight (solids) of the acyloxy terminated polysiloxane and the oxime terminated polysiloxane.

21. The laminate as in claim 20, including a curing catalyst in said siloxane combination, said catalyst being an organotin compound which is present in an amount of about 0.1 to about 0.5 weight percent based upon the combined weight of said siloxanes.

22. The laminate as in claim 21, wherein said acyloxy terminated polysiloxane is present in an amount of from about 65 to about 85 percent by weight based upon the combined weight (solids) of the acyloxy terminated polysiloxane and the oxime terminated polysiloxane, and wherein the oxime terminated polysiloxane is present in an amount of from about 15 to about 35 percent by weight based upon the combined weight (solids) of the acyloxy terminated polysiloxane and the oxime terminated polysiloxane, and wherein the catalyst is dibutyltin dilaurate.

* * * * *